March 20, 1928.　　　　　　　　　　　　　　1,663,493
H. C. CLAY
CONTROL FOR VARIABLE SPEED MECHANISM
Filed May 23, 1927　　　　3 Sheets-Sheet 1

INVENTOR
Harry C. Clay,
BY
Hood + Hahn.
ATTORNEYS

March 20, 1928.
H. C. CLAY
1,663,493
CONTROL FOR VARIABLE SPEED MECHANISM
Filed May 23, 1927
3 Sheets-Sheet 2
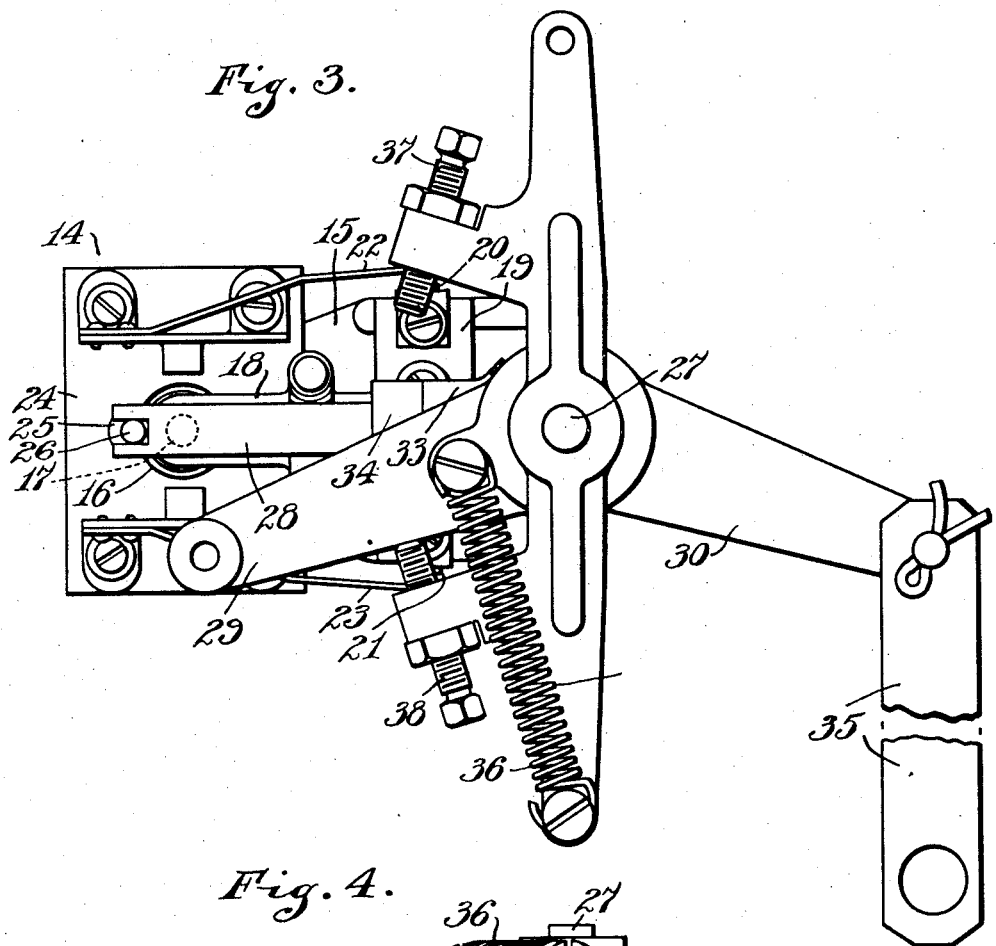
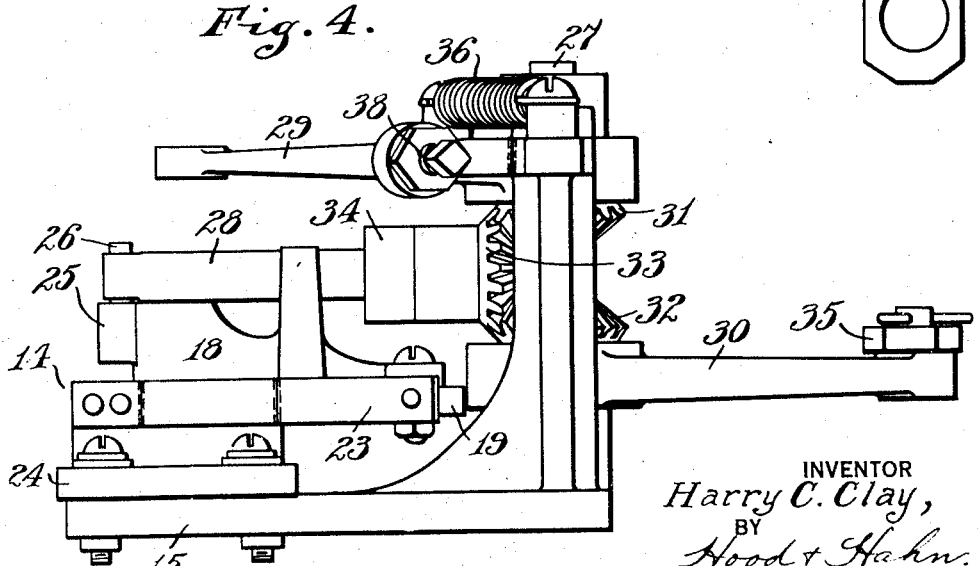
INVENTOR
Harry C. Clay,
BY
Hood & Hahn
ATTORNEYS March 20, 1928.  1,663,493
H. C. CLAY
CONTROL FOR VARIABLE SPEED MECHANISM
Filed May 23, 1927   3 Sheets-Sheet 3
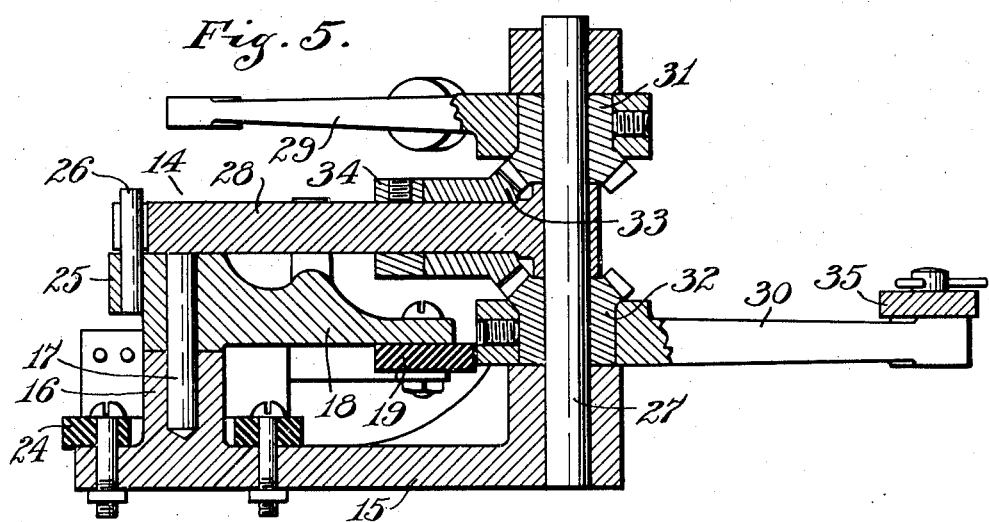
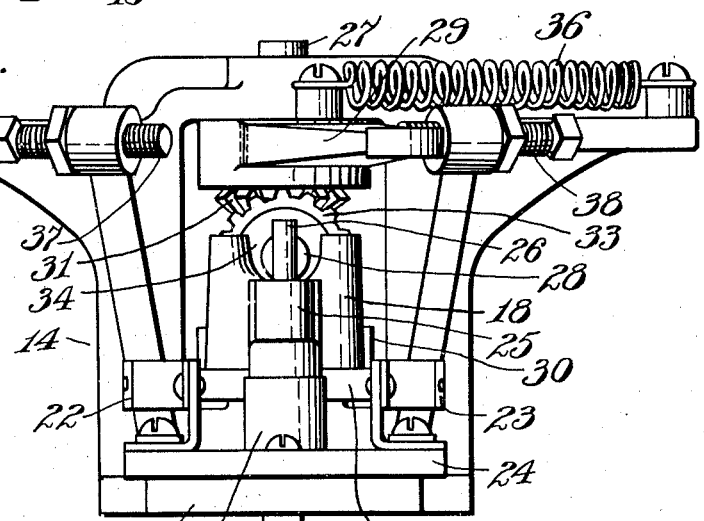
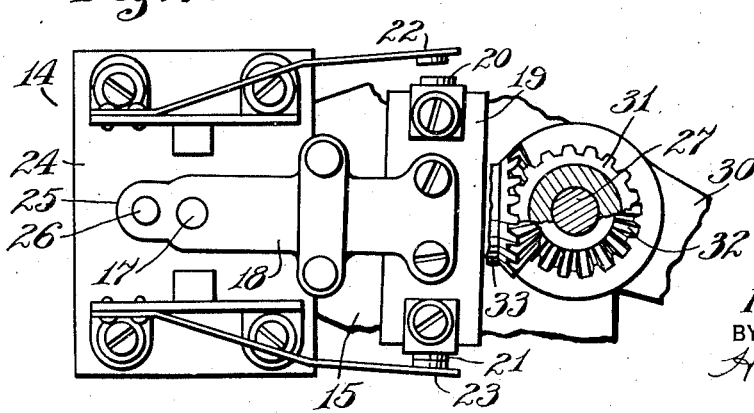
INVENTOR
Harry C. Clay,
BY
Hood + Hahn.
ATTORNEYS Patented Mar. 20, 1928.

1,663,493

UNITED STATES PATENT OFFICE.

HARRY C. CLAY, OF COLUMBUS, INDIANA, ASSIGNOR TO REEVES PULLEY COMPANY, OF COLUMBUS, INDIANA, A CORPORATION OF INDIANA.

CONTROL FOR VARIABLE-SPEED MECHANISM.

Application filed May 23, 1927. Serial No. 193,480.

My invention relates to means for controlling the operation of speed varying transmission. It is particularly applicable to that type of speed varying transmission commercially known as the "Reeves" transmission.

One of the objects of my invention is to provide an automatic controller for the above type of transmission which is extremely sensitive in its response to varying conditions and which will automatically set the transmission to operate at the speed required.

For the purpose of disclosing my invention I have illustrated one embodiment thereof in the accompanying drawings in which Fig. 1 is a schematic view showing the application of my invention to a "Reeves" transmission;

Fig. 3 is a plan view of the motor controlling switch;

Fig. 4 is a side elevation thereof;

Fig. 5 is a longitudinal section;

Fig. 6 is an end view, and

Fig. 7 is a plan view partially in section.

Figure 1:
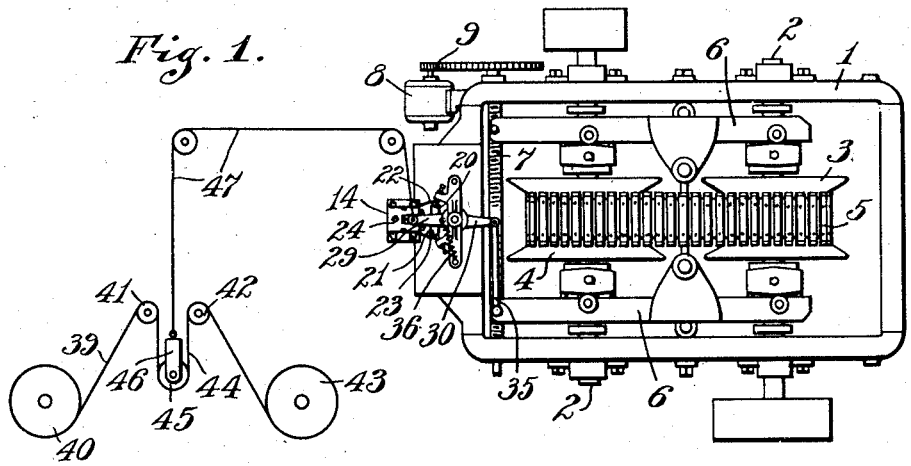
Figure 2:
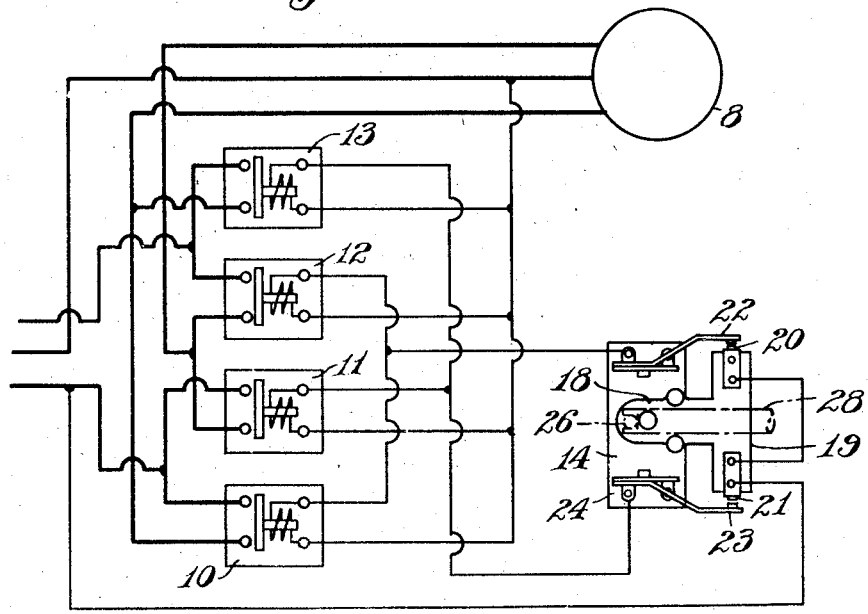
Fig. 2 is a diagrammatic view of the circuit arrangement of the motor control.

In the embodiment of the invention illustrated I provide a "Reeves" transmission which comprises the frame 1 having mounted therein suitable shafts 2, 2 on which are mounted two pairs of friction cones 3 and 4 connected by a belt 5. A pair of levers 6, 6 operate the cones to position them towards or from each other for varying the speed of the driven member. These levers are operated by a threaded controlling shaft 7 carrying nuts which in turn engage the ends of the levers, the nuts being so arranged on the shaft 7 that as the shaft revolves in one direction the ends of the levers will be drawn toward one another and as the shaft revolves in the opposite direction they will be separated. The shaft 7 is driven by a reversible electric motor 8 through suitable driving gearing 9. The motor illustrated is of the three phase type and its circuit is controlled by solenoid switches 10, 11, 12, and 13, whose circuits in turn are controlled by a master control switch 14 forming a part of the automatic control mechanism.

The automatic control mechanism comprises a base 15 from which extends a vertical boss 16 adapted to receive a pivot pin 17 of the rocking switch arm 18. This switch arm 18 carries an insulating block 19 having mounted on its opposite sides contact posts 20 and 21, which are adapted to respectively engage or contact with spring contact fingers 22 and 23 mounted on an insulating block 24 secured on the base 15. The arm 18 has a rear extension 25 carrying an operating pin 26.

A mounting frame extends upwardly from the base 15 and supports a shaft 27, the upper end of which takes into the top cross bar of the frame. This shaft has rotatably mounted thereon an arm 28, the free end of which is forked and straddles the operating pin 26. An operating lever 29 is also rotatably mounted on the shaft 27 and a second operating lever 30 is likewise rotatably mounted on the shaft 27. The lever 29 surrounds the hub of a bevel gear 31 and the lever 30 surrounds the hub of a bevel gear 32, both mounted on the shaft 27 and each secured to rotate with its lever. These two bevel gears mesh with a bevel gear 33 rotatably mounted on the arm 28 and held into meshing engagement with the gears 31 and 32 by a set collar 34. The lever 30 is connected by a link 35 with one of the levers 6 of the transmission so that this lever 30 will move coincidentally with the lever to which it is attached. The other lever 29 is adapted to be connected with a suitable operating mechanism and is biased in one direction by a coil spring 36 and operates between the adjustable limit stops 37 and 38.

In the structure illustrated the arm, or lever, 29 is adapted to be changed in accordance with the length of the bight in a paper web which is being transferred from one roll to another. As illustrated in Fig. 1, the web 39 passes off the delivery roll 40 over a pair of idler rolls 41 and 42 to the receiving roll 43. A bight 44 is formed in the web between the rolls 41 and 42 and resting in this bight is a roll 45 mounted in a suitable saddle 46 connected by a cable 47 with the arm 29. The take-off roll 43 is adapted to be driven from the variable speed transmission so that its speed may be changed in accordance with the requirements. If the paper passes off the roll 40 at too great a speed, the bight 44 will increase and automatically operate the transmission mechanism to increase the speed of the take-off roll 43. Likewise, if the web is being delivered too slowly from the delivery roll 40, the length of the bight 44 will decrease and therefore the mechanism will be automatically operated to decrease the speed of the take-off roll 43.

In operation we will assume that the speed of the take-off roll 43 is such that the delivery roll 40 is delivering the web faster than it is being taken up by the take-off roll 43. Under these circumstances the bight 44 will lengthen and the weight of the roll 45 operating on the cable 47 will move the arm 29, against the tension of the coil spring 36, and rotate the gear 31 on the shaft 27. Due to the fact that the arm 30 and the gear 32 are stationary, at this time, the differential gear 33 will move the arm 28 in the same direction as the arm 29 and the arm 28, through its connection with the pin 26 will throw the contact arm 18 in a direction to cause contacts 21 and 23 to engage, thereby closing the circuit through the electric motor in a direction to operate the levers 6 to move the cones 4 towards one another and the cones 3 away from one another, thereby increasing the speed at which the roll 43 is driven. At the same time movement is imparted to the lever 30 in a direction in a counter-clockwise direction, looking at Fig. 3, it being borne in mind that the lever 29 is moved in a clockwise direction. So long as the two levers 29 and 30 are being rotated in opposite directions at the same speed, there will be no effect on the lever 28 and the motor will continue to operate to move the cone discs 4 toward one another and the discs 3 away from one another. As soon, however, as the speed of the roller 43 is increased sufficiently to cause a slight shortening of the bight 43, the speed of rotation of the arm 29 will slacken, while the movement of the arm 30 will continue. This will immediately cause a rotation of the arm 28 to separate the contacts 21 and 23 and stop the motor.

It is obvious that if the speed of the roll 43 is so great as to cause the bight 44 to shorten, the cable 47 will be slacked off so that the spring 36 will bias the arm 29 in the reverse direction and the reverse operation as above described will take place.

I claim as my invention:

1. The combination with a variable speed mechanism, of an electric motor for controlling the same to cause it to drive at varying speeds, a switch controlling the operation of said motor and means for operating said switch, including a pair of operating arms operated by different agencies, an arm for operating said switch and a differential gear operably connecting said arms.

2. The combination with a variable speed mechanism, of an electric motor for controlling the same to cause it to drive at varying speeds, a switch controlling the operation of said motor and means for operating said switch, including a differential gear the two driving gears of which are operated by different agencies and the planetary gear of which is operably connected with said switch.

3. The combination with a variable speed mechanism, of an electric motor for controlling the same to cause it to drive at varying speeds, a switch controlling the operation of said motor and means for operating said switch, including a differential gear the planetary pinion of which is operably connected with said switch and one of the driving gears of which is rotated by said motor.

4. The combination with a variable speed mechanism, of an electric motor for controlling the same to cause it to drive at varying speeds, a switch controlling the operation of said motor, and a differential gearing for operating said switch, one of the gears of said gearing being driven with said electric motor, a second gear being operably connected to said switch and a third gear being adapted to be operated by a separate agency.

5. The combination with a variable speed mechanism, an electric motor for controlling the same to cause it to drive at varying speeds, a switch controlling the operation of said motor, and a differential gear for operating said switch, one of the driving gears of said differential gear being rotated by said motor, the other driving gear of said gearing being rotated by an independent agency and the planetary gear of said gearing being operably connected to said switch.

6. The combination with a variable speed mechanism, of an electric motor for controlling the same to cause it to drive at varying speeds, a switch for controlling the operation of said motor and a differential gearing for operating said switch, one of the driving gears of said gearing being drivingly connected with the motor, the opposite driving gear being operated by an independent agency and the planetary gear of said gearing being rotatably mounted on an arm rotating on an axis coincident with the axes of the driving gears and operably connected with the switch.

In witness whereof I, HARRY C. CLAY, have hereunto set my hand at Columbus, Indiana, this 17th day of May, A. D. one thousand nine hundred and twenty seven.

HARRY C. CLAY.